United States Patent [19]
Schlanzky

[11] 3,765,435
[45] Oct. 16, 1973

[54] TANK VENT CONTROL UNIT

[75] Inventor: Manfred P. H. Schlanzky, Frankenmuth, Mich.

[73] Assignee: General Motors Corporation, Detroit, Mich.

[22] Filed: Nov. 10, 1971

[21] Appl. No.: 197,298

[52] U.S. Cl. .................. 137/39, 137/43, 137/202
[51] Int. Cl. ............................................ F16k 17/36
[58] Field of Search ................ 137/39, 43, 44, 202; 220/44 B

[56] References Cited
UNITED STATES PATENTS

| 2,194,348 | 3/1940 | Zoder | 137/43 |
| 476,844 | 6/1892 | Van Auken | 137/202 X |
| 2,232,279 | 2/1941 | Snyder | 137/43 |

Primary Examiner—Robert G. Nilson
Assistant Examiner—Edward Look
Attorney—J. L. Carpenter et al.

[57] ABSTRACT

In a vehicular fuel tank venting system, a valve controlling fluid access to the tank vent line is positioned by a float responsive to the fuel level adjacent the tank vent opening and by a weighted ball responsive to vehicle maneuvers which could cause a surge of liquid fuel into the vent line before the float can respond to an increased fuel level.

2 Claims, 3 Drawing Figures

PATENTED OCT 16 1973 3,765,435

INVENTOR.
Manfred P.H. Schlanzky
BY
C.K. Veenstra
ATTORNEY

TANK VENT CONTROL UNIT

This invention relates to a vent control unit useful for the purpose of preventing loss of liquid fuel from a vehicular fuel tank through its vent line.

In the vent control unit provided by this invention, a valve member controls fluid flow through a vent opening. The valve is carried on a float which is responsive to the liquid level adjacent the vent opening; upon an increase in the liquid level, the float lifts the valve member to close the vent opening — thereby preventing loss of liquid fuel.

At the base of the vent control unit provided by this invention, a weighted ball is carried on a conical ramp. During maneuvers which could cause liquid to surge through the vent opening before the float can lift the valve member, the ball is accelerated up the conical ramp and raises the float which then lifts the valve member to close the vent opening.

The details as well as other objects and advantages of this invention are set forth below and shown in the drawings in which.

Figure 1:
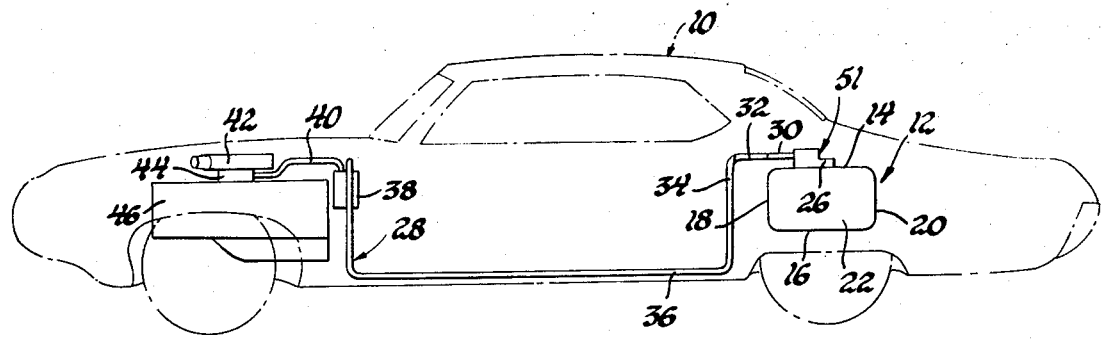
FIG. 1 is a side elevational view of a vehicle having the novel fuel tank venting system disposed therein and illustrating the vertical routing of the vent line.
Figure 2:
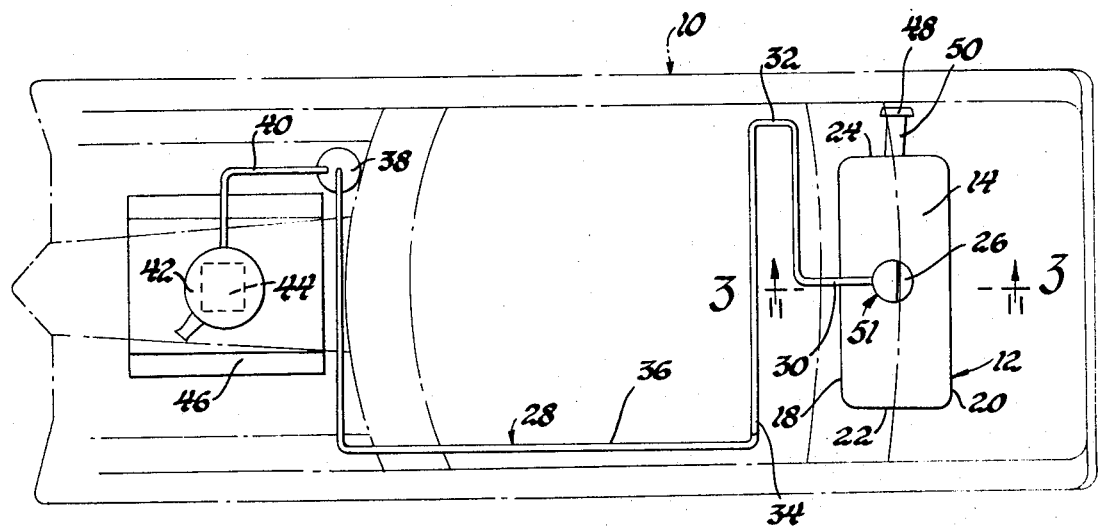
FIG. 2 is a plan view of the vehicle illustrating the lateral routing of the vent line.

Referring first to FIGS. 1 and 2, a vehicle 10 has a fuel tank 12 disposed therein. As here illustrated, the fuel tank 12 is disposed over the rear axle of the vehicle, but such a location is only exemplary and the use of this invention is not limited to a fuel tank in such a location.

Fuel tank 12 includes upper and lower walls 14 and 16, forward and rear walls 18 and 20, and end walls 22 and 24. A dome 26 extends upwardly from upper wall 14 for purposes described below.

A vent line 28 extends from dome 26 and includes a first portion 30 disposed above the upper wall 14 of fuel tank 12, a second portion 32 disposed laterally a selected distance outwardly of end wall 24 of fuel tank 12, a third portion 34 disposed outwardly a selected distance beyond end wall 22 of fuel tank 12 and a fourth portion 36 disposed a selected distance below the lower wall 16 of fuel tank 12. Such a routing of vent line 28 contains liquid fuel against loss from fuel tank 12 to the atmosphere irrespective of the attitude of vehicle 10 and fuel tank 12 with respect to the longitudinal axis of vehicle 10.

Vent line 28 extends forwardly to a fuel vapor storage unit 38, such as a charcoal canister, which contains fuel vapor against loss to the atmosphere. A purge line 40 extends from the vapor storage unit 38 to the air cleaner 42, carburetor 44, or other portion of the induction system of the vehicle engine 46 whereby fuel vapors emitted from fuel tank 12 may be consumed during engine operation.

Dome 26 serves not only as a portion of the venting system elevated above the upper wall 14 of fuel tank 12 but also may be utilized as a liquid-vapor separator which prevents flow of liquid fuel into vent line 28. To serve this purpose, dome 26 may comprise a hollow enclosure providing an expansion chamber opening from fuel tank 12 to vent line 28 or one of the various standpipe configurations which have been utilized to achieve the liquid-vapor separator function. Preferably, however, dome 26 contains the vent control unit 51 shown in FIG. 3 to achieve this result.

Figure 3:
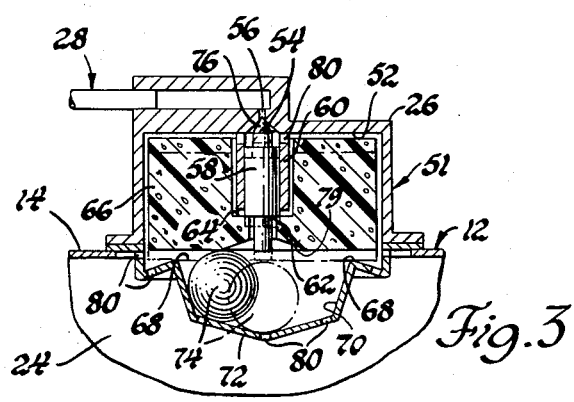
FIG. 3 is an enlarged sectional view of the tank vent control unit, taken generally along line 3—3 of FIG. 2.

Referring to FIG. 3, dome 26 is formed to provide a portion of vent line 28 and a chamber 52. A valve seat 54 surrounds an opening 56 from chamber 52 to vent line 28. A valve member 58 associated with valve seat 54 controls flow through opening 56. The dot-dash line position of the elements in FIG. 3 shows the valve-open condition of the unit 51, and the solid line position shows the valve-closed condition.

Valve member 58 is guided by a sleeve 60 and has a downwardly facing shoulder 62. Shoulder 62 is received and supported by a shelved portion 64 of an annular float 66. Upon an increase in the fuel level adjacent chamber 52, above that associated with normal vehicle operation, float 66 will rise and lift valve 58 into engagement with valve seat 54. This prevents any loss of liquid fuel into vent line 28.

It will be noted that in the valve-open position, float 66 rests on an annular ledge 68. A wall 70, which may be either cylindrical or conical as shown, extends downwardly from ledge 68 to a conical ramp 72. A weighted ball 74 rests on ramp 72. During vehicle maneuvers — such as acceleration, deceleration or cornering — which might cause a surge of liquid fuel into vent line 28 before float 66 can float upwardly, ball 74 is forced radially outwardly along ramp 72. Ramp 72 lifts ball 74 which raises float 66 to engage valve 58 against seat 54. This prevents any loss of liquid fuel into vent line 28 during such maneuvers.

Wall 70 is disposed at a selected distance along ramp 72 to limit travel of ball 74, thereby preventing ball 74 from being wedged between ramp 72 and float 66 and also preventing damage to or sticking of the resilient tip 76 on valve 58 when it engages seat 54.

It will be noted that the lower surface of float 66 is formed with a recess 79, shown in FIG. 3 as being conical. In the event fuel tank 12 should be inverted, float 66 would float toward ledge 68; absent recess 79, float 66 would tend to hold ball 74 away from valve 58 and reduce the closing force on valve 58. Recess 79 permits the full weight of ball 74 to act on the stem of valve 58 which extends through the central opening in float 66, thereby providing for the maximum closing force on valve 58 to prevent loss of liquid fuel.

Valve unit 51 includes a plurality of openings 80 which permit the passage of fuel vapor and air between tank 12 and vent line 28, some of which also allow liquid fuel to drain from chamber 52.

With this construction, vent control unit 51 serves as a liquid-vapor separator, preventing loss of liquid fuel from tank 12 through vent line 28 while permitting fuel vapor to bleed out of tank 12 through vent line 28.

It will be appreciated, of course, that the venting system herein disclosed serves not only to contain fuel against loss from tank 12 to the atmosphere but also to admit air into tank 12 as fuel is withdrawn therefrom. In addition, appropriate valves may be incorporated in vent line 28 or the otherwise sealed cap 48 which closes the filler pipe 50 for tank 12 for the purpose of regulating pressure and vacuum conditions within tank 12.

It also will be appreciated that, although vent line 28 is shown as being routed from the forward side of dome 26, vent line 28 also could extend rearwardly from dome 26, laterally to each side of tank 12, vertically above and below tank 12, and forwardly toward the engine compartment.

Further, it should be appreciated that use of the vent line configuration described herein with the vent control unit also described herein represents, to at least some extent, redundant protective measures. Either of the described improvement would be useful in a situation where the other is not present.

I claim:

1. A vent control unit adapted for use on a vehicle fuel tank and comprising:
   means defining a vent opening,
   a vertically reciprocable vavle member disposed below and engageable with said opening to prevent fluid flow therethrough,
   an annular float member surrounding said valve member and engageable with said valve member to raise said valve member into engagement with said opening in response to an increase in the liquid level adjacent said opening,
   an upwardly opening conical ramp member disposed below said float member,
   a ball disposed on said ramp member and engageable with said float member to raise said float and thereby to raise said valve member into engagement with said opening in response to horizontal acceleration of said ball,
   means limiting movement of said float member away from said opening,
   and wherein said valve member projects downwardly through said float member and the lower surface of said float member has an upwardly concave recess surrounding said valve member whereby said ball may engage said valve member to move said valve member relative to said float member and into engagement with said opening in the event said unit is inverted.

2. A vent control unit adapted for use on a vehicle fuel tank having a vent opening and comprising:
   an upwardly opening conical ramp member,
   a ball disposed on said ramp member for horizontal movement along and vertical movement up said ramp member upon horizontal acceleration of said ball,
   an annular wall extending upwardly from said ramp member to limit travel of said ball along and up said ramp member, said annular wall providing an annular ledge,
   an annular float member disposed on said ledge for vertical displacement therefrom upon an increase in liquid level thereadjacent or upon movement of said ball along and up said ramp member, said float member having a centrally disposed upwardly facing shelved portion,
   a valve member received by said shelved portion and engageable with said opening to prevent fluid flow therethrough,
   whereby said float member lifts said valve member into engagement with said opening upon an increase in liquid level and said ball raises said float member to lift said valve member into engagement with said opening upon horizontal acceleration to thereby prevent loss of liquid fuel through said vent opening,
   and wherein said valve member has a stem portion extending downwardly through said float member and wherein said float member has an upwardly concave conical recess surrounding said stem portion whereby said ball may engage said stem portion to move said valve member relative to said float member and into engagement with said opening in the event said unit is inverted.

* * * * *